United States Patent
Couleaud et al.

(10) Patent No.: US 9,282,530 B1
(45) Date of Patent: Mar. 8, 2016

(54) IN-FLIGHT ENTERTAINMENT SYSTEM THAT IDENTIFIES SEAT LOCATIONS OF VIDEO DISPLAY UNITS AND PERSONAL ELECTRONIC DEVICES

(71) Applicant: Thales Avionics, Inc., Irvine, CA (US)

(72) Inventors: Jean-Yves Couleaud, Mission Viejo, CA (US); Tracy Decuir, Yorba Linda, CA (US); David Reichert, Orange, CA (US); Roberto Filocamo, Long Beach, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 14/512,604

(22) Filed: Oct. 13, 2014

(51) Int. Cl.
  *H04W 24/00* (2009.01)
  *H04W 64/00* (2009.01)
  *H04W 76/02* (2009.01)
  *H04W 72/04* (2009.01)
  *H04W 24/08* (2009.01)
  *H04W 72/08* (2009.01)

(52) U.S. Cl.
  CPC .............. *H04W 64/00* (2013.01); *H04W 24/08* (2013.01); *H04W 72/0406* (2013.01); *H04W 72/082* (2013.01); *H04W 76/021* (2013.01)

(58) Field of Classification Search
  CPC ..... H04W 24/08; H04W 64/00; H04W 88/08; H04W 72/0406; H04W 72/082
  See application file for complete search history.

(56) References Cited

U.S. PATENT DOCUMENTS

| | | | |
|---|---|---|---|
| 2006/0142002 A1* | 6/2006 | Funderburk | B64D 11/0015 455/431 |
| 2009/0112638 A1* | 4/2009 | Kneller | G06Q 10/02 705/5 |
| 2013/0029685 A1* | 1/2013 | Moshfeghi | G01S 19/48 455/456.1 |
| 2014/0208370 A1* | 7/2014 | Hatakeyama | H04N 21/2146 725/76 |

* cited by examiner

*Primary Examiner* — Khalid Shaheed
(74) *Attorney, Agent, or Firm* — Myers Bigel & Sibley, P.A.

(57) ABSTRACT

An entertainment system includes radio access nodes (RANs) spaced apart from each other and a location measurement node. The location measurement node includes a memory and at least one processor. The memory contains a seat layout map identifying an arrangement of seats and locations of the RANs relative to the seats. The processor measures distances between the RANs and a transceiver device located at a seat among the seats arranged according to a seat layout map residing in memory, and retrieves from the seat layout map, the locations of the RANs relative to the seats. The processor identifies one of the seats within the seat layout map where the transceiver device is located based on comparison of the measured distances and the retrieved locations of the RANs relative to the seats, and stores in the memory an identifier for the transceiver device associated with an identifier for the seat.

19 Claims, 6 Drawing Sheets

IN-FLIGHT ENTERTAINMENT SYSTEM THAT IDENTIFIES SEAT LOCATIONS OF VIDEO DISPLAY UNITS AND PERSONAL ELECTRONIC DEVICES

TECHNICAL FIELD

The present disclosure relates to entertainment systems and, more particularly, in-flight entertainment systems.

BACKGROUND

In-flight entertainment (IFE) systems are deployed onboard aircraft to provide entertainment services for passengers in a passenger cabin. The IFE systems typically provide passengers with television and audio multimedia entertainment programming.

One type of IFE system is a "server centric" architecture where multimedia content is located on a server or a set of servers installed in an electronic bay somewhere in the airplane. Video content is played through displays installed at overhead locations or within seatbacks, and associated audio content is played through jacks provided in seat armrests.

Another type of IFE system is a "seat centric" architecture where content is stored in mass data storage devices located at individual seats and played through associated seat displays. The server (or set of servers) acts as an injection point for content that will be later installed locally into the seat mass data storage devices, and also acts as a secondary source for content that may not fit in the seat mass data storage devices.

Cabin crew (e.g., flight attendants) can operate control terminals to control the IFE entertainment system. The control terminals can include computer monitors and optional peripherals installed at spaced apart locations within the cabin that are accessible to the cabin crew during flight operations.

There has also been an emergence of wireless systems providing connectivity to passenger personal electronic devices (PEDs), such as Internet access, as well as limited streaming entertainment, such as movies. These systems typically require less installation effort and are limited to using servers installed in electronic bays somewhere in the airplane that stream content and communication control commands through wireless access points installed at spaced apart locations in overhead compartments of the airplane.

IFE installations can use substantial aircraft resources, such as equipment bay space, electrical power, weight, and cost. Each of the seat devices of an IFE system are typically networked through lengthy, heavy, and costly data network cabling to one or more servers to communicate commands and receive content.

Because of these components and network cabling, each IFE system is customized to each particular aircraft seat layout, referred to as a Layout of Passenger Accommodations (LOPA). Differences in architectures and layouts of IFE systems between aircraft necessitates separate and independent setup configuration and testing by IFE vendors and customers.

SUMMARY

Some embodiments of the present disclosure are directed to an entertainment system that includes a plurality of radio access nodes and a location measurement node. The radio access nodes are spaced apart from each other. The location measurement node includes a memory and at least one processor. The memory contains a seat layout map identifying an arrangement of a plurality of seats and locations of the radio access nodes relative to the seats. At least one processor is configured to measure distances between the radio access nodes and a transceiver device located at a seat among the plurality of seats arranged according to a seat layout map residing in memory, and retrieve from the seat layout map the locations of the radio access nodes relative to the seats. The at least one processor is further configured to identify one of the seats within the seat layout map where the transceiver device is located based on comparison of the measured distances and the retrieved locations of the radio access nodes relative to the seats, and store in the memory an identifier for the transceiver device associated with an identifier for the identified one of the seats.

Other systems, apparatus, and methods according to embodiments of the present disclosure will be or become apparent to one with skill in the art upon review of the following drawings and detailed description. It is intended that all such additional systems, apparatus, and methods be included within this description and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Although various embodiments are explained herein in the context of entertainment systems for an In-Flight Entertainment (IFE) environment of an aircraft, other embodiments of the entertainment systems are not limited thereto and may be used in other types of vehicles, including ships, buses, and trains, and for non-vehicle installations for conference rooms, classrooms, buildings, etc.

Figure 1:
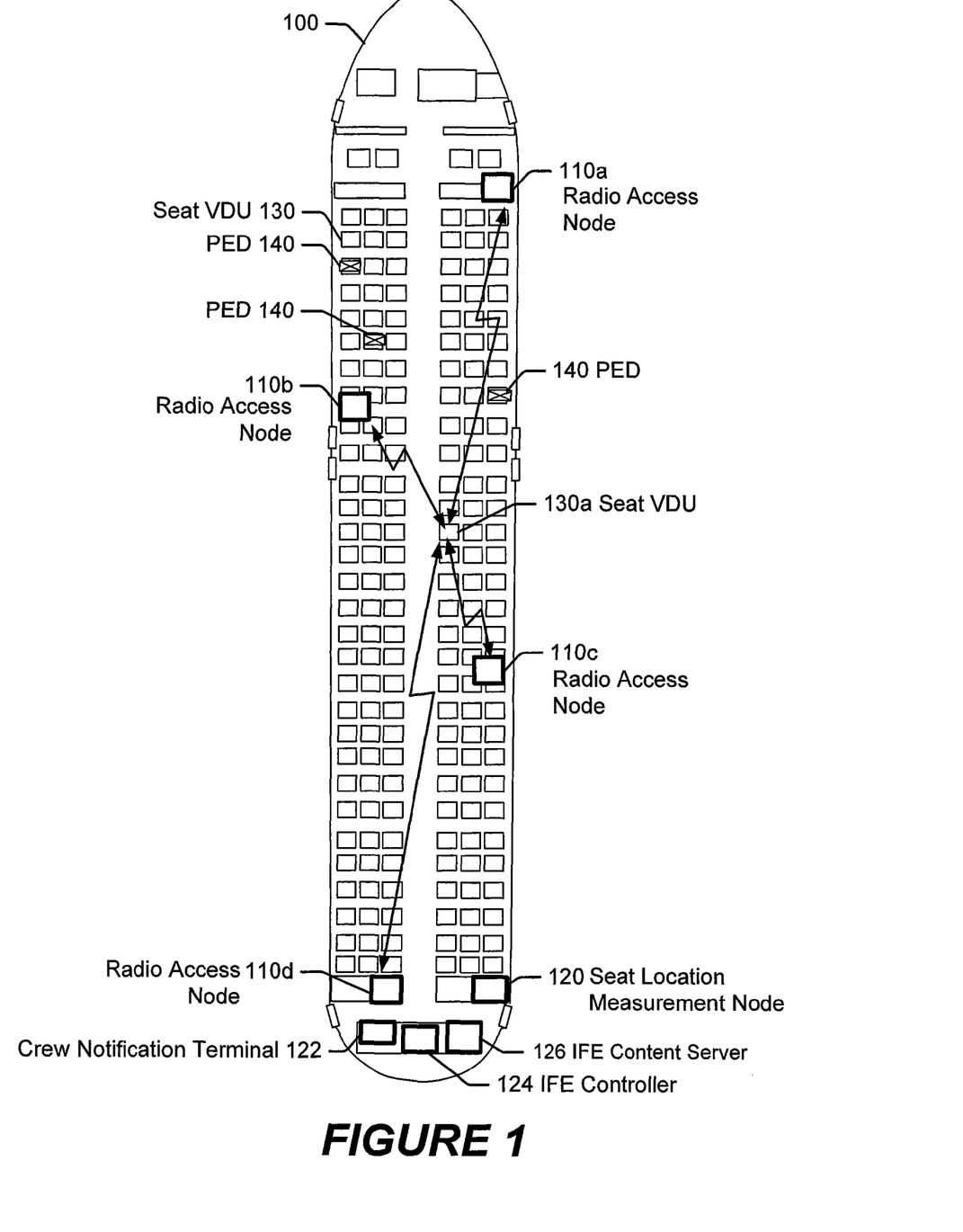
FIG. 1 illustrates an IFE system that includes a seat location measurement node that uses radio access nodes spaced apart within the cabin to identify seats where transceiver devices are located, and which operates according to some embodiments.

FIG. 1 illustrates an IFE system that includes radio access nodes 110a, 110b, 110c, and 110d that are deployed (mounted) at spaced apart locations within an aircraft fuselage 100 to provide corresponding wireless communication service areas to seat video display units (VDUs) 130 and personal electronic devices (PEDs) 140. The seat VDUs 130 may include displays that are mounted to seatbacks and/or mounted to tray tables that are deployable from armrests. The PEDs 140 may correspond to any personal electronic device having wireless communications capabilities that can be carried by a passenger onto an aircraft, including, without limitation, tablet computers, laptop computers, palmtop computers, cellular smart phones, media players, etc.

The seat VDUs 130 and the PEDs 140 can be used by passengers for IFE services in which video and other content is wirelessly communicated from an IFE content server 126 under control of an IFE controller 124 through various ones of the radio access nodes 110a-d. Passengers may also be provided in-flight shopping services through the seat VDUs 130 and the PEDs 140 based on product catalogs that are downloaded from the IFE content server 126. Passengers may order products and/or services through the seat VDUs 130 and the PEDs 140 for delivery by the crew during the flight, with the passenger orders being wirelessly communicated through various ones of the radio access nodes 110a-d and displayed on a crew notification terminal 122. The seat VDUs 130 and the PEDs 140 may also be used to communicate with the aircraft crew through the crew notification terminal 122, allowing passengers to make meal requests, drink requests, and other requests. The seat VDUs 130 and the PEDs 140 may also be used for passenger to passenger communications, such as allowing a passenger to text message another passenger using their seat identifier. The crew notification terminal 122 may be a mobile terminal, such as a tablet computer, or non-mobile terminal mounted to a bulkhead or other fixture of the aircraft.

It is therefore important for the crew to be able to identify the locations of the seat VDUs 130 and the PEDs 140 with respect to a seat layout, such as being able to identify a row and seat number for a seat VDU or a PED from which a passenger request was received. For example it would be advantageous for the crew to be presented with both a passenger request and an identifier for the seat (e.g., row and seat number) where the seat VDU or the PED from which the request was received. The request and identified seat may be displayed on the crew notification terminal 122.

However, identifying the seat location of a seat VDU or PED is complicated by the variability in the number of rows and columns of passenger seats and the number of seats within particular rows between aircraft of the same model. The seat layout is configured to optimize profitability while accommodating expected demands for the number of passengers and room allocated to each passenger for differing flight routes and/or times of year. This is further complicated when attempting to identify the locations of the PEDs 140 which are typically carried onto the aircraft by the passengers and, therefore, reside wherever the passengers are assigned or otherwise choose to sit.

Various present embodiments are directed to automatically determining the seat locations of seat VDUs 130, PEDs 140, and/or other transceiver devices operable by passengers (e.g., a crew request button located at each seat). A seat location measurement node 120 is configured to determine the seat location of a transceiver device, examples of which are referred to as in a non-limiting manner as one of the seat VDUs 130 or as one of the PEDs 140. Although the seat location measurement node 120 is illustrated as being separate from the radio access nodes 110a, 110b, 110c, and 110d, some or all of the operations described herein as being performed by the seat location measurement node 120 may instead be performed by one or more of the radio access nodes 110a, 110b, 110c, and 110d.

Figure 2:
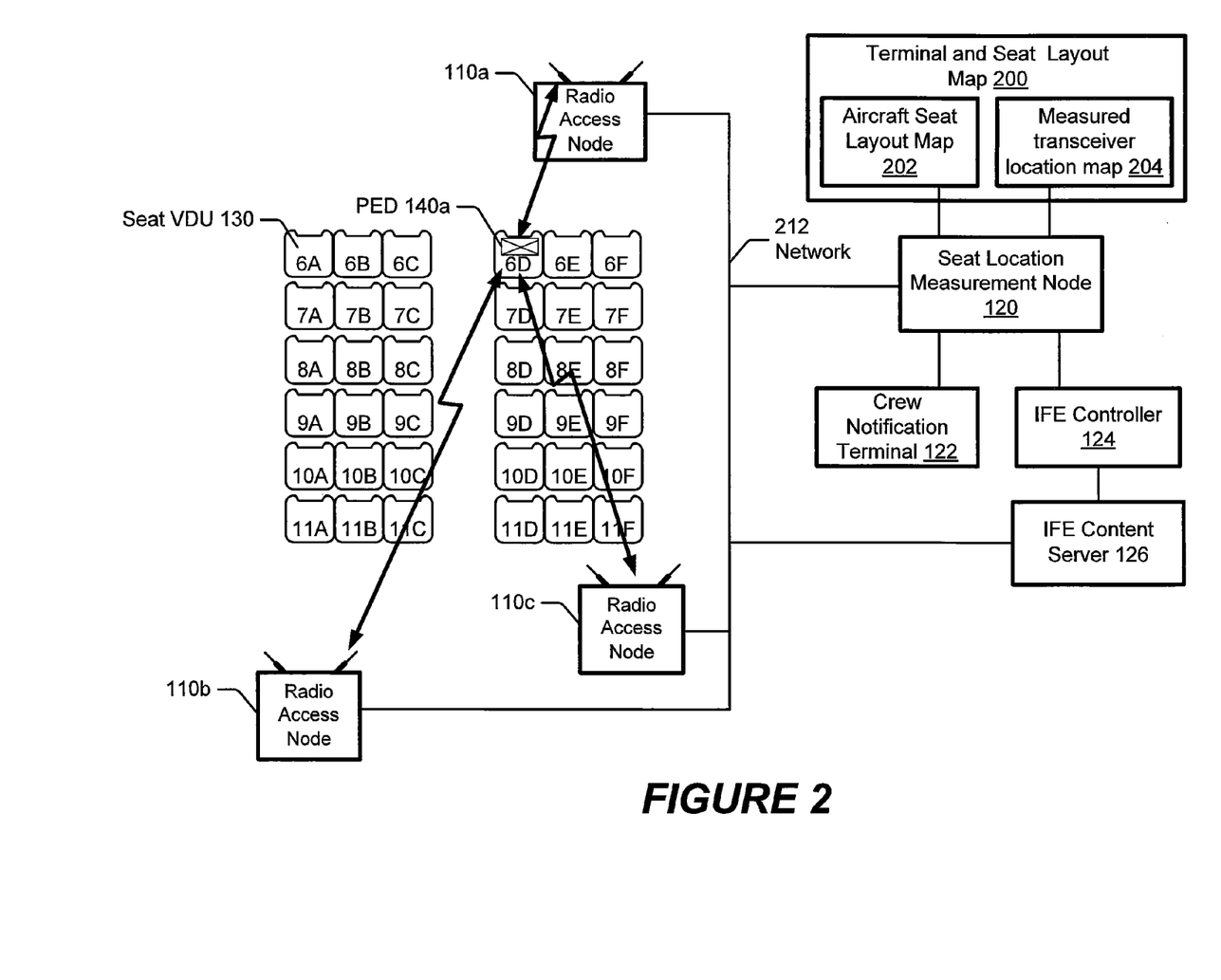
FIG. 2 illustrates further elements of the seat location measurement node and other components of the IFE system for identifying and displaying locations of the transceiver devices among the seats in accordance with some embodiments.
Figure 3:
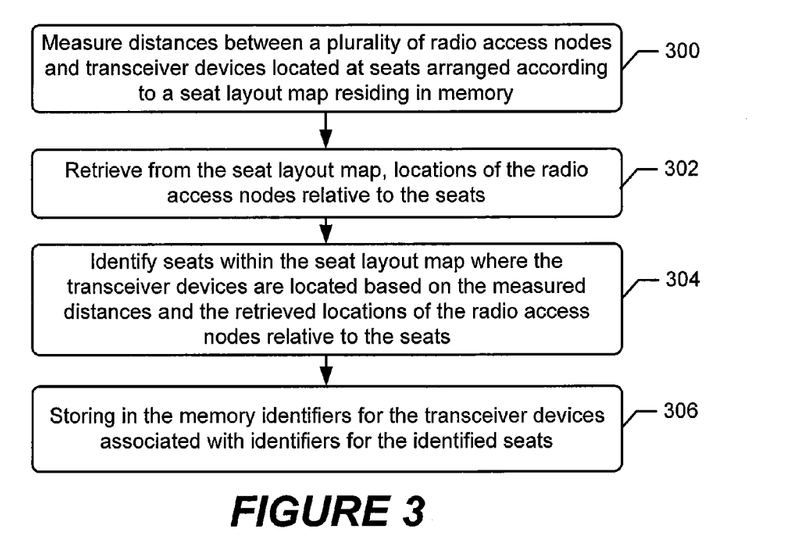
FIGS. 3-6 are flowcharts of operations and methods that may be performed by the seat location measurement node of FIGS. 1 and 2 in accordance with some embodiments.

FIG. 2 illustrates further elements of the seat location measurement node 120 and other components of the IFE system for identifying and displaying locations of the transceiver devices among the seats in accordance with some embodiments. FIG. 3 is a flowchart of operations and methods may be performed by the seat location measurement node 120 to determine the seat location of a transceiver device.

The IFE content server 126 streams and/or downloads content through a wired network 212 for wireless distribution by the radio access nodes 110 to the seat VDUs 130 and the PEDs 140. In some other embodiments, the radio access nodes 110 may each contain mass memory that stores content for distribution to the seat VDUs 130 and the PEDs 140. A radio access node 110 may, for example, stream and/or download content from its internal mass memory and/or form the internal mass memory of other ones of the radio access nodes 110 to seat VDUs 130 and the PEDs 140 serviced by the radio access node 110. Accordingly, functionality provided by the IFE content server 126 may be replaced or augmented by functionality of the radio access nodes 110. The seat location measurement node 120 can be communicatively connected through the network 212 to receive measurements by the radio access nodes 110 as explained below.

Referring to FIGS. 2 and 3, the seat location measurement node 120 operates to identify the seat locations of transceiver devices, such as the seat VDUs 130 and the PEDs 140, and to store in a memory identifiers for the transceiver devices associated with an identifier for the identified seats were they are located. In the particular example of FIG. 3, operations are performed for determining the seat location of a PED 140a which is located at seat location 6D among the seats illustrated as conventionally arranged columns in rows and columns. These operations may be similarly used to identify the seat location of a seat VDU 130.

The seat location measurement node 120 may contain or access a terminal and seat layout map 200 residing in a memory. Before determination of where particular seat VDUs 130 and PEDs 140 are located, the terminal and seat layout map 200 contains an aircraft seat layout map 202 that defines how the seats are arranged within the aircraft, and which may identify the number of rows of seats, the number of columns of seats, and the number of seats within particular rows and columns. The terminal and seat layout map 200 may identify offset distances between the seats, may more particularly identify offset distances between particular seats when the offset differences differ along the fuselage. The terminal and seat layout map 200 also identifies locations of the radio access nodes 110a-d relative to the seats. For example, the terminal and seat layout map 200 may identify the distance between the radio access nodes 110a-d and one or more defined reference points within the aircraft, such as identifying the distance from particular ones of the radio access nodes 110a-d to one or more identified seats or identifying which seats are located closest to which of the radio access nodes 110a-d.

The seat location measurement node 120 measures (block 300) distances between a plurality of radio access nodes, such as two or more of the radio access nodes 110a-d, and the PED 140a located at one of the seats which is not yet identified among the seats arranged according to the seat layout map 202. The seat location measurement node 120 retrieves (block 302) from the seat layout map, locations of the radio access nodes relative to the seats, and identifies (block 304) one of the seats within the seat layout map where the PED 140a is located based on comparison of the measured distances and the retrieved locations of the radio access nodes relative to the seats. The seat location measurement node 120 then stores (block 306) in a measured transceiver location map 204, an identifier for the PED 140a associated with an identifier for the identified one of the seats.

Figure 4:
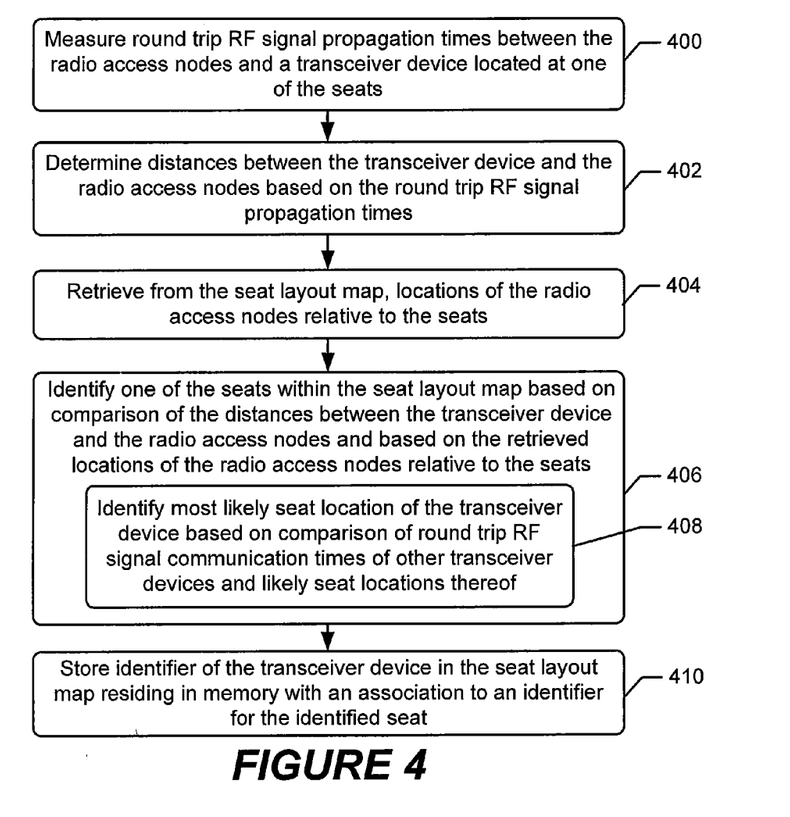

In the embodiment of FIG. 4, the seat location measurement node 120 measures (block 400) round-trip radio frequency (RF) signal propagation times between the radio access nodes and the PED 140a, and determines (block 402) the distances between the radio access nodes and the PED 140a based on the round-trip RF signal propagation times.

The seat location measurement node 120 can then retrieve (block 404) locations of the radio access nodes within the seat layout map, and identify (block 406) one of the seats (e.g., seat "6D") within the seat layout map based on comparison of the distances between the PED 140a in the radio access nodes and based on the locations of the radio access nodes relative to the seats. The seat location measurement node 120 then stores (block 410) an identifier of the PED 140a in the measured transceiver location map 204 associated with an identifier (e.g., "6D") for the identified seat.

When identifying (block 406) the seat where PED 140a is located, the seat location measurement node 120 may identify (block 408) the most likely seat location based on comparison of the round-trip RF signal communication times of other PEDs 140 and the likely seat locations thereof. For example, assuming that each passenger possesses a single PED, the seat location measurement node 120 can attempt to resolve the mappings of closely-spaced PEDs 140 to different seats by comparing the potentially small differences between their round-trip RF signal communication times to identify the most likely seat location of each of the PEDs 140. User (e.g., crew) confirmation of correctness of one of the mappings may be used to shuffle other adjacent mappings. This approach may be particularly advantageous when used to resolve mappings of closely-spaced seat VDUs 130 where there is a one-to-one mapping of each seat VDU 132 to a different one of the seats.

The seat location measurement node 120 may operate to respond to the determination that at least two of the transceiver devices (e.g., PED 140a and another PED located at an adjacent seat "6E") are within a threshold distance of a same one of the seats, by re-measuring distances between the radio access nodes and each of the at least two transceiver devices located within the threshold distance of the same one of the seats. For each of the at least two transceiver devices located within the threshold distance of the same one of the seats, the seat location measurement node 120 can identify one of the seats within the seat layout map where the transceiver device is located based on comparison of the re-measured distances for the at least two transceiver devices located within the threshold distance of the same one of the seats. In this manner, the seat location measurement node 120 may recursively perform measurements to improve the accuracy of the location matching of transceiver devices to seats.

Figure 5:
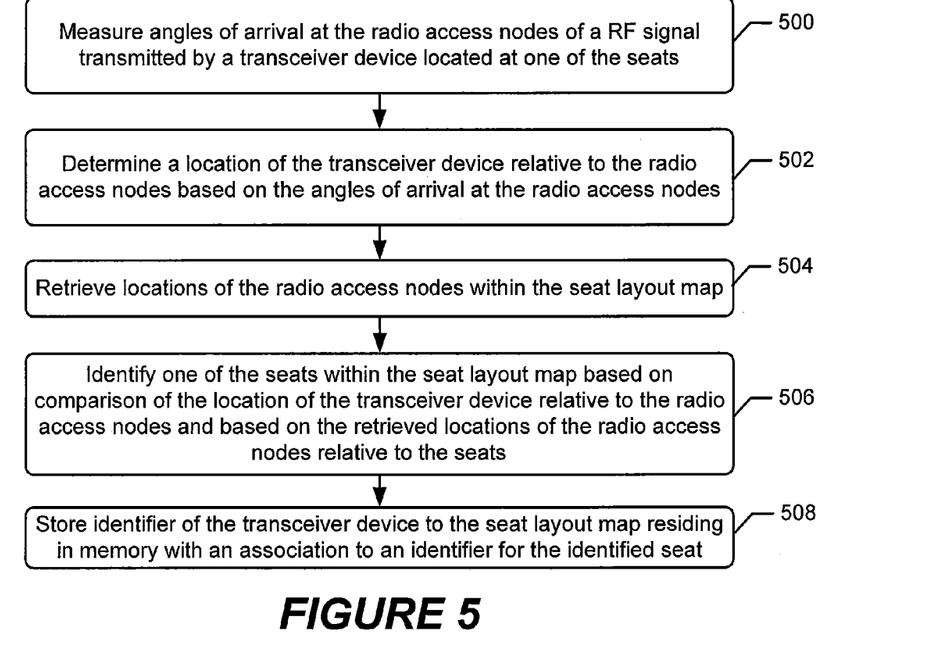

As an alternative to or in addition to using round-trip RF signal propagation times, the seat location measurement node 120 may measure distances between the radio access nodes and the PED 140a based on angles for arrival of RF signals from the PED 140a. In the embodiment of FIG. 5, the seat location measurement node 120 measures (block 500) angles of arrival at the radio access nodes of a RF signal transmitted by PED 140a, and determines (block 502) the distances between the radio access nodes and the PED 140a based on the angles of arrival at the radio access nodes of the RF signal.

A radio access node may include an array of spaced apart antennas, and operate to measure the angle of arrival of a RF signal by measuring the time of arrival of the RF signal at different ones of the spaced apart antennas to determine the angle of arrival of the RF signal to the antennas.

The seat location measurement node 120 can then retrieve (block 504) locations of the radio access nodes within the seat layout map, and identify (block 506) one of the seats (e.g., seat "6D") within the seat layout map based on comparison of the distances between the PED 140a in the radio access nodes and based on the locations of the radio access nodes relative to the seats. When identifying the seat where PED 140a is located, the seat location measurement node 120 may identify the most likely seat location based on comparison of the angles of arrival of RF signals transmitted by other PEDs 140 and the likely seat locations thereof. For example, assuming that each passenger possesses a single PED, the seat location measurement node 120 can attempt to resolve the mappings of closely-spaced PEDs 140 to different seats by comparing the potentially small differences between the angles of arrival of their respective RF signals at different ones of the radio access nodes to identify the most likely seat location of each of the PEDs 140. This approach may be particularly advantageous when used to resolve mappings of closely-spaced seat VDUs 130 where there is a one-to-one mapping of each seat VDU 132 to a different one of the seats.

The seat location measurement node 120 then stores (block 508) an identifier of the PED 140a in the measured transceiver location map 204 associated with an identifier (e.g., "6D") for the identified seat.

Figure 6:
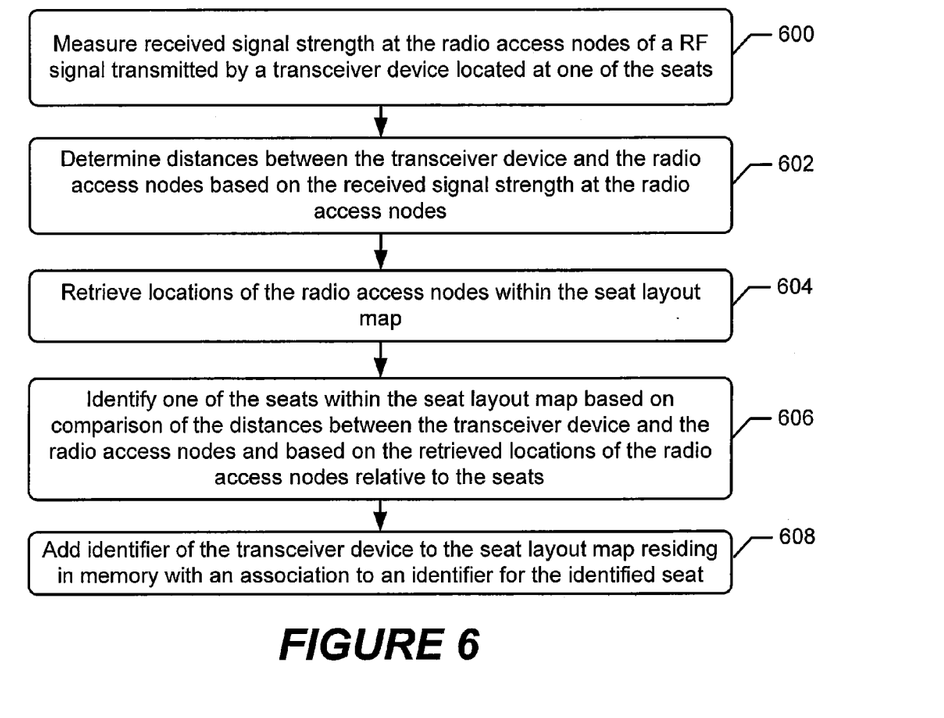

As an alternative to or in addition to using round-trip RF signal propagation times and/or angles of arrival, the seat location measurement node 120 may measure received signal strengths at the radio access nodes of a RF signal transmitted by the PED 140a. In the embodiment of FIG. 6, the seat location measurement node 120 measures (block 600) received signal strengths at the radio access nodes of a RF signal transmitted by PED 140a, and determines (block 602) the distances between the radio access nodes and the PED 140a based on the received signal strengths at the radio access nodes of the RF signal.

The seat location measurement node 120 can then retrieve (block 604) locations of the radio access nodes within the seat layout map, and identify (block 606) one of the seats (e.g., seat "6D") within the seat layout map based on comparison of the distances between the PED 140a in the radio access nodes and based on the locations of the radio access nodes relative to the seats. When identifying the seat where PED 140a is located, the seat location measurement node 120 may identify the most likely seat location based on comparison of the angles of arrival of RF signals transmitted by other PEDs 140 and the likely seat locations thereof.

For example, assuming that each passenger possesses a single PED, the seat location measurement node 120 can attempt to resolve the mappings of closely-spaced PEDs 140 to different seats by comparing the potentially small differences between the received signal strengths of their respective RF signals at different ones of the radio access nodes to identify the most likely seat location of each of the PEDs 140. This approach may be particularly advantageous when used to resolve mappings of closely-spaced seat VDUs 130 where there is a one-to-one mapping of each seat VDU 132 to a different one of the seats.

The seat location measurement node 120 then stores (block 608) an identifier of the PED 140a in the measured transceiver location map 204 associated with an identifier (e.g., "6D") for the identified seat.

In some other embodiments, distances between the radio access nodes 110 and a seat VDU 130 and/or a PED 140 are determined based on the geographical coordinates. The radio access nodes 110, the seat VDU 130, and the PED 140 may each include GPS receivers configured to determine their respective geographic coordinates based on received GPS signals. The seat location measurement node 120 can receive from the seat VDU 130 and/or the PED 140 geographical coordinates of the seat VDU 130 and/or the PED 140 determined from GPS signals received by the seat VDU 130 and/or the PED 140. The seat location measurement node 120 can receive from the radio access nodes 110 geographical coordinates of the radio access nodes 110 determined from GPS signals received by the radio access nodes 110. The seat location measurement node 120 can determine the distances between the radio access nodes and the transceiver device based on the geographical coordinates.

Operations and methods of FIGS. 3-6 can be repeated to identify the seat locations of other transceiver devices within the aircraft, and to store identifiers for the transceiver devices associated with identifiers for the identified seats in the terminal and seat layout map 200, such as in the measured transceiver location map 204.

The crew notification terminal 122 can use the terminal and seat layout map 200 to look up the seat location of a transceiver device from which a notification message has been received. For example, the crew notification terminal 122 or another component of the system may be configured to receive a notification message from a transceiver device, and responsively retrieve the identifier for the identified one of the seats from the memory based on the identifier for the transceiver device. The crew notification terminal 122 may display a schematic of seats arranged according to the seat layout map and display indicia representing the locations of the transceiver devices relative to particular seats among the schematic of seats. The displayed schematic may include seat icons arranged in rows and columns corresponding to the present aircraft seat configuration and further include indications of the row and seat numbers of the displayed seats. The schematic can further illustrate identifiers for locations of seat VDUs 130 and/or PEDs 140 from which notification messages (e.g., passenger requests) have been received.

Figure 7:
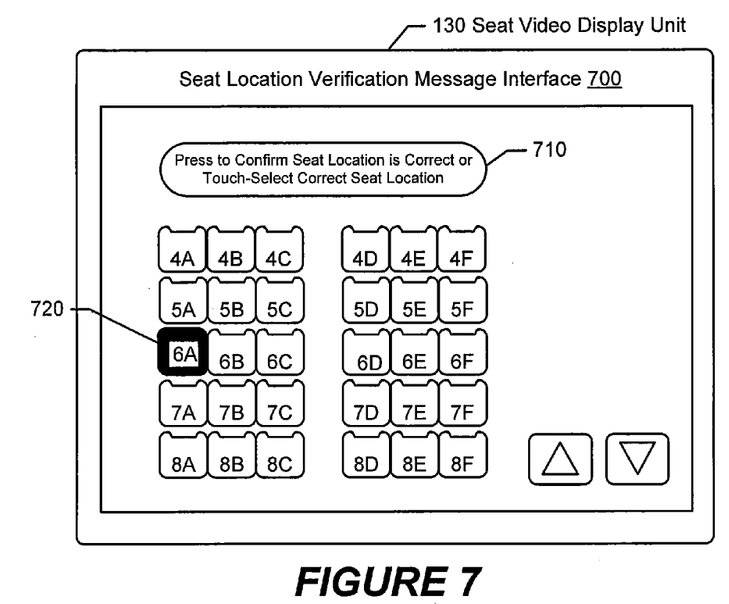
FIG. 7 illustrates a seat location verification message interface displayed on a seat video display unit at one of the seats to confirm correctness of the identified seat location in accordance with some embodiments.
Figure 8:
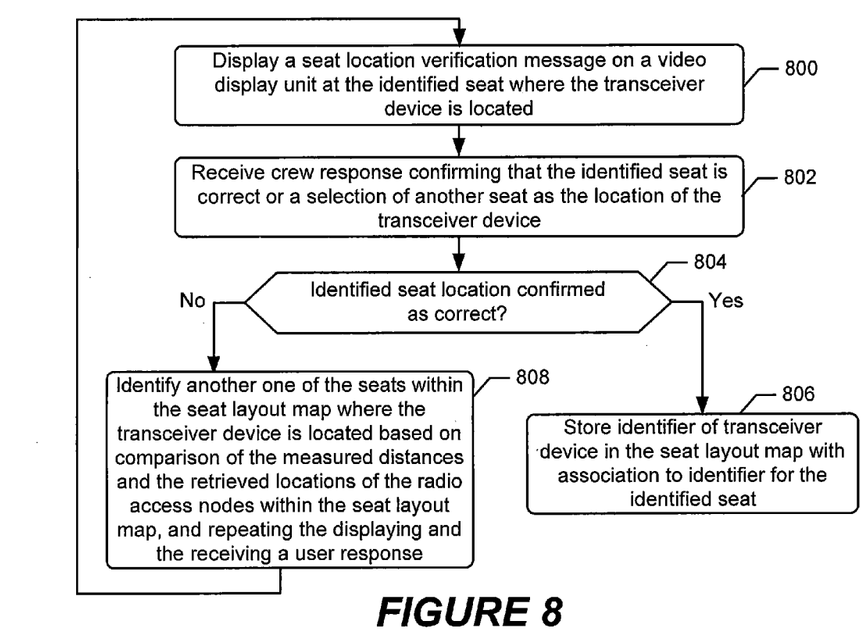
FIG. 8 is a flowchart of operations and methods that may be performed by the seat location measurement node of FIGS. 1 and 2 to confirm correctness of the identified seat location in accordance with some embodiments.

The location measurement node 120 may perform a confirmation process that includes having a crew member or other user confirm that the measured locations of the transceiver devices correctly correspond to the identified seats. FIG. 7 illustrates a seat location verification message interface that can be displayed on a seat VDU 130 at one of the seats to confirm correctness of the identified seat location in accordance with some embodiments. FIG. 8 is a flowchart of corresponding operations and methods that may be performed by the seat location measurement node 120 to confirm correctness of the identified seat location in accordance with some embodiments.

Referring to FIGS. 7 and 8, an identifier for one of the seats (e.g., seat "6A") where a seat VDU 130 was measured as being located, can be displayed (block 800) on the seat VDU 130 associated with the identified one of the seats (e.g., seat "6A"). A user response is received (block 802) indicating whether the displayed identifier is correct.

In the example of FIG. 7, the illustrated seat location verification message interface 700 can be displayed on a selected one of the seat VDUs 130 that faces seat location "6A" for confirmation by a user that the measured location of the particular one of the seat VDUs 130 was correctly identified as being at seat location "6A". An indicia 720 for seat location "6A" is displayed differently (e.g., filled-in) than the other displayed seat indicia, for seats within a threshold distance of the identified seat location "6A", to indicate where the selected one of the seat VDUs 130 is believed to face. A user can touch-select a displayed indicia 710 to confirm that the measured location of the seat VDU 130 is correct or incorrect. Additionally or alternatively, if the displayed location is incorrect, the user may touch select another one of the seat indicia where the seat VDU 130 is facing to input the selected seat to the location measurement node 120.

Responsive to identifying (block 804) that the user has confirmed correctness, an identifier of the transceiver device can be stored (block 806) in the terminal and layout map 200 associated with an identifier for the identified seat (e.g., "6A"). In contrast, responsive to the user indicating that the displayed identifier is incorrect, the location measurement node 120 identifies (block 808) another one of the seats within the seat layout map where the transceiver device is located based on comparison of the measured distances and the retrieved locations of the radio access nodes within the seat layout map. The location measurement node 120 then repeats the displaying (block 800), the receiving (block 802), and the re-identifying (block 808), such as until a user confirms (block 804) that the identified seat location is correct.

When the user touch selects or otherwise enters another one of the seat indicia where the seat VDU 130 is facing as an input responsive to the identified seat location (block 804) being incorrect, the location measurement node 120 stores an identifier of the transceiver device in the terminal and layout map 200 associated with an identifier for the seat identified by the user (e.g., "6B"). The location measurement node 120 may shuffle the identified seat locations of other transceiver devices that are nearby the transceiver device based on the identifier of the seat where the transceiver device is located. For example, the selected seat locations displayed in seat location verification messages 700 on seat VDUs 130 facing nearby seats "5A", "5B", "5C", "6C", "7A", etc. may be modified (shuffled) based on information learned from the user's confirmation feedback or correctness/incorrectness relating to seat "6A".

Responsive to identifying (block 804) that the user has confirmed correctness, an identifier of the transceiver device can be stored (block 806) in the terminal and layout map 200 associated with an identifier for the identified seat (e.g., "6A"). In contrast, responsive to the user indicating that the displayed identifier is incorrect, the location measurement node 120 shuffles (block 808) identified seat locations of other transceiver devices that are nearby the transceiver device based on the identifier of the seat where the transceiver device is located. The location measurement node 120 may then repeat the displaying (block 800) and the receiving (block 802), and the re-identifying (block 808) until a user confirms (block 804) that the identified seat location is correct.

Figure 9:
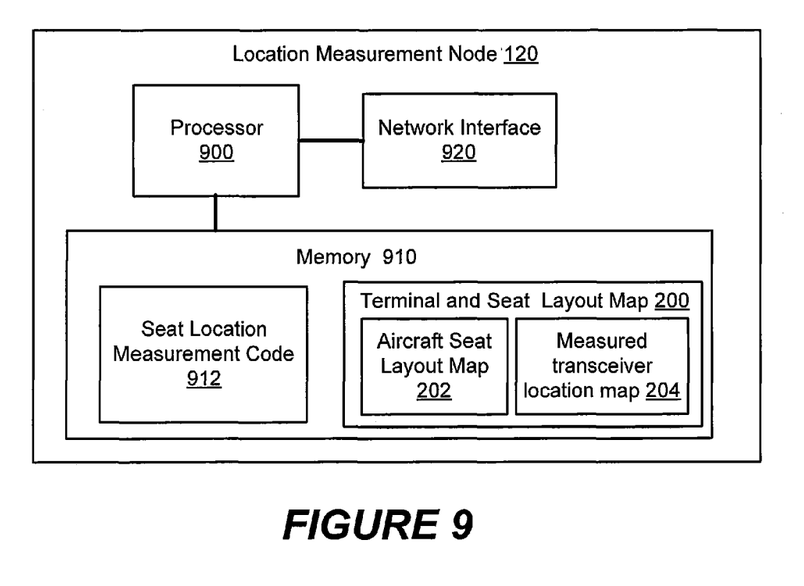
FIG. 9 is a block diagram of the seat location measurement node configured according to some embodiments.

FIG. 9 is a block diagram of a location measurement node 120 that is configured according to some embodiments of the present disclosure. The location measurement node 120 includes at least one processor 900 ("processor"), at least one memory 910 ("memory"), and at last one network interface 920 ("network interface"). The processor 900 may include one or more data processing circuits, such as a general purpose and/or special purpose processor (e.g., microprocessor and/or digital signal processor) that may be collocated or distributed across one or more networks. The processor 900 is configured to execute computer readable program code in the memory 910, described below as a non-transitory computer readable medium, to perform some or all of the operations and methods that are described herein for one or more of the embodiments.

The memory 910 can include seat location measure code 912 that configures the processor 900 to perform the operations or more of more of the embodiments disclosed herein for the location measurement node 120. The memory 910 may further include information described herein for the seat layout map 200. The network interface 920 can communicatively connect the location management node to the crew notification terminal 122, the IFE controller 124, a separate memory in which the terminal and seat layout map may reside (e.g., when separate from the location measurement node 120), and/or other components of the system.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a non-transitory computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method by a seat location measurement computer node comprising:
   measuring distances between a plurality of radio access nodes and a plurality of transceiver devices located at different respective ones of seats arranged according to a seat layout map residing in memory, based on measurements of radio frequency (RF) signals received by the radio access nodes from the transceiver devices;
   retrieving from the seat layout map, locations of the radio access nodes relative to the seats;
   for each of the transceiver devices, identifying one of the seats within the seat layout map where the transceiver device is located based on comparison of the measured distances between the radio access nodes and the transceiver device and the retrieved locations of the radio access nodes relative to the seats, and further based on comparison of the measured distances between the radio access nodes and the other transceiver devices to identify which of the seats within the seat layout map is closest to the transceiver device;
   for each of the transceiver devices, storing in the memory an identifier for the transceiver device associated with an identifier for the identified one of the seats;
   receiving through a network interface a user request message from one of the transceiver devices that is directed to a notification terminal, the user request message containing the identifier for the transceiver;
   retrieving from the memory the identifier for the one of the seats that is associated with the identifier for the transceiver; and
   controlling the notification terminal to display a passenger request notification with an indication of the identifier for the one of the seats that is associated with the identifier for the transceiver, which was retrieved from the memory.

2. The method of claim 1, wherein, for each of the transceiver devices, the measuring distances between the radio access nodes and the transceiver device based on measurements of radio frequency (RF) signals received by the radio access nodes from the transceiver device, comprises:
   measuring round-trip radio frequency (RF) signal propagation times between the radio access nodes and the transceiver device; and
   determining the distances between the radio access nodes and the transceiver device based on the round-trip RF signal propagation times.

3. The method of claim 1, wherein, for each of the transceiver devices, the measuring distances between the radio access nodes and the transceiver device based on measurements of radio frequency (RF) signals received by the radio access nodes from the transceiver device, comprises:
   measuring angles of arrival at the radio access nodes of a radio frequency (RF) signal transmitted by the transceiver device; and
   determining the distances between the radio access nodes and the transceiver device based on the angles of arrival at the radio access nodes of the RF signal.

4. The method of claim 1, wherein, for each of the transceiver devices, the measuring distances between the radio access nodes and the transceiver device based on measurements of radio frequency (RF) signals received by the radio access nodes from the transceiver device, comprises:
   measuring received signal strengths at the radio access nodes of a radio frequency (RF) signal transmitted by the transceiver device; and
   determining the distances between the radio access nodes and the transceiver device based on the received signal strengths at the radio access nodes of the RF signal.

5. The method of claim 1, wherein, for each of the transceiver devices, the measuring distances between the radio access nodes and the transceiver device based on measurements of radio frequency (RF) signals received by the radio access nodes from the transceiver device, further comprises:
   receiving from the transceiver device geographical coordinates of the transceiver device determined from GPS signals received by the transceiver device;
   receiving from the radio access nodes geographical coordinates of the radio access nodes determined from GPS signals received by the radio access nodes; and
   determining the distances between the radio access nodes and the transceiver device based on the geographical coordinates.

6. The method of claim 1, further comprising:
   responsive to determining that at least two of the transceiver devices are within a threshold distance of a same one of the seats,
   re-measuring distances between the radio access nodes and each of the at least two transceiver devices located within the threshold distance of the same one of the seats, and
   for each of the at least two transceiver devices located within the threshold distance of the same one of the seats, identifying one of the seats within the seat layout map where the transceiver device is located based on comparison of the re-measured distances for the at least two transceiver devices located within the threshold distance of the same one of the seats.

7. The method of claim 1, further comprising, for each of the transceiver devices:
   displaying the identifier for the identified one of the seats on a video display unit associated with the identified one of the seats closest to the transceiver device;
   receiving a user response indicating whether the displayed identifier is correct; and
   responsive to the user response indicating the displayed identifier is incorrect, identifying another one of the seats within the seat layout map where the transceiver device is located based on comparison of the measured distances between the radio access nodes and the transceiver device and the retrieved locations of the radio access nodes-relative to the seats within the seat layout map, and further based on comparison of the measured distances between the radio access nodes and the other transceiver devices to identify which of the seats within the seat layout map is next closest to the transceiver device, and repeating the displaying and the receiving a user response.

8. The method of claim 1, further comprising, for each of the transceiver devices:
displaying the identifier for the identified one of the seats on a video display unit associated with the identified one of the seats closest to the transceiver device;
receiving a user response indicating whether the displayed identifier is correct and, when incorrect, a user entered identifier of the seat where the transceiver device is located;
responsive to the user response indicating the displayed identifier is incorrect, shuffling identified seat locations of other transceiver devices that are nearby the transceiver device based on the identifier of the seat where the transceiver device is located; and
storing in the memory the identifier for the transceiver device associated with the user entered identifier of the seat.

9. An entertainment system comprising:
a plurality of radio access nodes spaced apart from each other; and
a location measurement computer node comprising:
a memory containing a seat layout map identifying an arrangement of a plurality of seats and locations of the radio access nodes relative to the seats; and
at least one processor configured to:
measure distances between the radio access nodes and a plurality of transceiver devices located at different respective ones of seats arranged according to a seat layout map residing in the memory, based on measurements of radio frequency (RF) signals received by the radio access nodes from the transceiver devices;
retrieve from the seat layout map, the locations of the radio access nodes relative to the seats;
for each of the transceiver devices, identify one of the seats within the seat layout map where the transceiver device is located based on comparison of the measured distances between the radio access nodes and the transceiver device and the retrieved locations of the radio access nodes relative to the seats, and further based on comparison of the measured distances between the radio access nodes and the other transceiver devices to identify which of the seats within the seat layout map is closest to the transceiver device;
for each of the transceiver devices, store in the memory an identifier for the transceiver device associated with an identifier for the identified one of the seats;
receive a user request message from one of the transceiver devices that is directed to a notification terminal, the user request message containing the identifier for the transceiver;
retrieve from the memory the identifier for the one of the seats that is associated with the identifier for the transceiver; and
control the notification terminal to display a passenger request notification with an indication of the identifier for the one of the seats that is associated with the identifier for the transceiver, which was retrieved from the memory.

10. The entertainment system of claim 9, further comprising the notification terminal configured to display a schematic of seats arranged according to the seat layout map and to respond to receipt of the user request message containing the identifier of the identified one of the seats by displaying an indicia representing the location of the transceiver device relative to the identified one of the seats among the schematic of seats.

11. The entertainment system of claim 9, wherein:
the transceiver device comprises a seatback video display unit attached to one of the seats; and
the at least one processor of the location measurement node identifies one of the seats within the seat layout map that faces the seat to which the seatback video display unit is attached, based on the comparison of the measured distances between the radio access nodes and the seatback video display and the retrieved locations of the radio access nodes relative to the seats, and further based on comparison of the measured distances between the radio access nodes and the other transceiver devices to identify which of the seats within the seat layout map is closest to the seatback video display.

12. The entertainment system of claim 9, wherein:
the transceiver device comprises a personal electronic device of a user who is seated at one of the seats; and
the at least one processor of the location measurement node identifies one of the seats within the seat layout map on which the user is seated while possessing the personal electronic device, based on the comparison of the measured distances between the radio access nodes and the personal electronic device and the retrieved locations of the radio access nodes relative to the seats, and further based on comparison of the measured distances between the radio access nodes and the other transceiver devices to identify which of the seats within the seat layout map is closest to the personal electronic device.

13. The entertainment system of claim 9, wherein:
the radio access nodes are mounted at spaced apart locations within an aircraft fuselage to provide entertainment services to passengers through a plurality of the transceiver devices.

14. The entertainment system of claim 9, wherein:
for each of the transceiver devices, the at least one processor of the location measurement node measures round-trip radio frequency (RF) signal propagation times between the radio access nodes and the transceiver device, and determines the distances between the radio access nodes and the transceiver device based on the round-trip RF signal propagation times.

15. The entertainment system of claim 9, wherein:
for each of the transceiver devices, the at least one processor of the location measurement node measures angles of arrival at the radio access nodes of a radio frequency (RF) signal transmitted by the transceiver device, and determines the distances between the radio access nodes and the transceiver device based on the angles of arrival at the radio access nodes of the RF signal.

16. The entertainment system of claim 9, wherein:
for each of the transceiver devices, the at least one processor of the location measurement node measures received signal strengths at the radio access nodes of a radio frequency (RF) signal transmitted by the transceiver device, and determines the distances between the radio access nodes and the transceiver device based on the received signal strengths at the radio access nodes of the RF signal.

17. The entertainment system of claim 9, wherein, for each of the transceiver devices, the at least one processor of the location measurement node is configured to:

responsive to determining that at least two of the transceiver devices are within a threshold distance of a same one of the seats,
re-measure distances between the radio access nodes and each of the at least two transceiver devices located within the threshold distance of the same one of the seats, and
for each of the at least two transceiver devices located within the threshold distance of the same one of the seats, identify one of the seats within the seat layout map where the transceiver device is located based on comparison of the re-measured distances for the at least two transceiver devices located within the threshold distance of the same one of the seats.

18. The entertainment system of claim 9, wherein the at least one processor of the location measurement node is configured to:
display the identifier for the identified one of the seats on a video display unit associated with the identified one of the seats;
receive a user response indicating whether the displayed identifier is correct; and
responsive to the user responsive indicating the displayed identifier is incorrect, identify another one of the seats within the seat layout map where the transceiver device is located based on comparison of the measured distances and the retrieved locations of the radio access nodes within the seat layout map, and repeating the displaying and the receiving a user response.

19. The entertainment system of claim 9, wherein the at least one processor of the location measurement node is configured to:
display the identifier for the identified one of the seats on a video display unit associated with the identified one of the seats;
receive a user response indicating whether the displayed identifier is correct and, when incorrect, a user entered identifier of the seat where the transceiver device is located;
responsive to the user responsive indicating the displayed identifier is incorrect, shuffle identified seat locations of other transceiver devices that are nearby the transceiver device based on the identifier of the seat where the transceiver device is located; and
store in the memory the identifier for the transceiver device associated with the user entered identifier of the seat.

* * * * *